United States Patent
Sullivan et al.

(10) Patent No.: US 10,878,513 B1
(45) Date of Patent: Dec. 29, 2020

(54) SYSTEM AND METHOD FOR IMPLEMENTING CUSTOM TRANSACTIONS AND IMPROVEMENTS TO GENERAL LEDGER FUNCTIONALITY

(71) Applicant: NetSuite Inc., San Mateo, CA (US)

(72) Inventors: Craig Sullivan, Kingsburg, CA (US); Stephen Clode, San Jose, CA (US)

(73) Assignee: NETSUITE INC., San Mateo, CA (US)

(*) Notice: Subject to any disclaimer, the term of this patent is extended or adjusted under 35 U.S.C. 154(b) by 216 days.

(21) Appl. No.: 14/708,024

(22) Filed: May 8, 2015

Related U.S. Application Data

(60) Provisional application No. 61/991,374, filed on May 9, 2014.

(51) Int. Cl.
*G06Q 10/00* (2012.01)
*G06F 9/44* (2018.01)
*G06Q 40/00* (2012.01)

(52) U.S. Cl.
CPC .................................. *G06Q 40/12* (2013.12)

(58) Field of Classification Search
CPC ........... G06Q 40/12; G06Q 10/00; G06F 9/44
USPC ........................................................ 705/30
See application file for complete search history.

(56) References Cited

U.S. PATENT DOCUMENTS

| | | | | |
|---|---|---|---|---|
| 2005/0278221 A1* | 12/2005 | Hahn-Carlson | ........ | G06Q 20/20 705/16 |
| 2009/0064090 A1* | 3/2009 | Anonsen | ................... | G06F 8/65 717/104 |
| 2010/0100426 A1* | 4/2010 | Sander | ............... | G06Q 10/0633 705/7.27 |
| 2010/0121923 A1* | 5/2010 | Cvetkovic | .............. | G06Q 10/06 709/206 |
| 2011/0264487 A1* | 10/2011 | Koerner | ................. | G06Q 10/04 705/7.38 |
| 2013/0159034 A1* | 6/2013 | Herter | .................... | G06Q 10/06 705/7.11 |
| 2014/0089150 A1* | 3/2014 | Wong | ..................... | G06Q 10/06 705/30 |

* cited by examiner

*Primary Examiner* — Luna Champagne
(74) *Attorney, Agent, or Firm* — Kraguljac Law Group, LLC

(57) ABSTRACT

Systems, apparatuses, and methods for enabling a user of a multi-tenant cloud-based business data processing platform to define one or more custom transactions having an impact on general ledger transactions. Such custom GL impacting transactions provide the power and flexibility for an ERP module of the platform to satisfy the varying requirements of national/international markets that have and often require additional transaction types to cover aspects of their business activity that have an ERP and/or GL impact, and which have not been supported or anticipated by a developer in the first instance. In this manner, providing a system, apparatus and method for altering existing native transaction types having a GL impact reduce complexities associated with GL bloat, version-lock, vendor-lock, and lack of upgradability.

14 Claims, 7 Drawing Sheets

Transaction Altering Input GUI     <u>450</u>

- Transaction Name
  461
- Numbering Scheme
  462
- Common Fields Selection
  463
- Custom Fields Selection
  464
- Printable Forms Selection
  465
- Permissions/Roles selection
  466
- Workflow Selection
  467
- Navigation and Help Documentation
  468
- Reporting and Search Selection
  469
- Posting Behavior
  470
- Inventory Impact
  471
- Accounts Receivable/Accounts Payable
  472
- Transformations
  473

Figure 4c

SYSTEM AND METHOD FOR IMPLEMENTING CUSTOM TRANSACTIONS AND IMPROVEMENTS TO GENERAL LEDGER FUNCTIONALITY

PRIORITY CLAIM

This application claims the benefit of U.S. Provisional Application No. 61/991,374, entitled "System and Methods for Implementing Custom Transactions and Improvements to General Ledger Functionality," filed May 9, 2014, which is incorporated by reference in its entirety herein for all purposes.

CROSS-REFERENCE TO RELATED APPLICATION

This application is cross-related to U.S. patent application Ser. No. 14/567,822, entitled "System and Methods for Implementing Custom Transactions within a Multi-Tenant Platform," filed Dec. 11, 2014, which is incorporated by reference in its entirety herein for all purposes.

BACKGROUND

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, and web-based customer support, as well as reporting and analysis capabilities relating to these functions. With differing levels of overlap with ERP/CRM initiatives and with each other, efforts have also been directed toward development of increasingly integrated partner and vendor management systems, web store/eCommerce systems, product lifecycle management (PLM) systems, and supply chain management (SCM) systems.

Traditionally, ERP systems—including modern Cloud-based ones—provide a defined set of transaction types based on the scope of the application intended by the developer. These defined transaction types may span typical, generic business processes, such as: Vendor Bills, Customer Invoices, Inbound and Outbound Payments, General Ledger (GL) Journals, as well as Industry/Vertical-specific transaction types, such as Revenue Recognition Journals or Inventory Adjustments. However, the diversity of businesses' operational requirements and the needs of vertical or company-specific workflows are typically not well served by such a predetermined and limited approach.

For example, the financial, tax, revenue recognition, or other impacts of an event may differ depending on the jurisdiction in which the event occurred, the state of a company at the time of the event, the external rules applicable to the company, and the like. A company may also have its own internal processes that require specific ways of tracking revenue generating events in order to properly account for the impact of those events on the company's other functions or operations. These might include, for example, a process to trigger an inventory maintenance or sales representative recognition process based on one or more events or characteristics of an event.

With conventional ERP systems, specific internal processes or situations are often handled by end users building out a Workflow, or by third party developers building add-ons or other forms of increased functionality. This approach can provide a standard GL Journal tracking the accounting impact of an event, but such an approach ignores the need to identify the transactions for searching/reporting in a specific context, allocating type-specific transaction number sequences, controlling access to only those users with the appropriate permissions, and enabling the transactions that are the subject of the customized aspects to be utilized more fully with the other capabilities of an entire ERP/CRM system or integrated business data processing platform, and the like In some cases, third party developers have been provided access to the core application code so that they can make customer- or industry-specific changes, thereby enabling them to develop type-specific transactions. But, such efforts require deep knowledge of the code-base and development architecture, as well as software development skills and processes. These are things that are often out of the reach of smaller development teams with limited resources and little experience in handling the high volume and reliability needs of Enterprises. Further, customizations and/or core code changes that are made to support additional functionality in a traditional on-premise (as opposed to cloud-based) platform are a fundamental reason why businesses deploying those systems end up with version lock challenges—it is impossible for the ERP system vendor to know what their customers have done to each deployment of the system when they have the ability to modify the core code in-house.

Embodiments described herein are directed toward solving these and other problems individually and collectively.

SUMMARY

Embodiments of the disclosure are directed to systems, apparatuses, and methods for enabling a user of a multi-tenant cloud-based business data processing platform to define one or more "custom transactions" having an impact on GL transactions. In one embodiment, such custom GL impacting transactions provide the power and flexibility for an ERP module of the platform to satisfy the varying requirements of national/international markets that have and often require additional transaction types to cover aspects of their business activity that have an ERP and/or GL impact, and which have not been supported or anticipated by a developer in the first instance.

Embodiments of the disclosure are directed to systems, apparatuses, and methods for enabling a user of a multi-tenant cloud-based business data processing platform to modify the behavior of built-in transactions types in the context of how they impact the GL component of the ERP system. In one embodiment, such "custom GL lines" provide the power and flexibility for an ERP module of the platform to satisfy the varying requirements of national/international markets that have (and often require) additional transaction types to cover aspects of their business activity that have an ERP and/or GL impact, and which have not been supported or anticipated by a developer in the first instance.

The inventive custom GL Lines provide a method by which a multi-tenant business data processing platform's core ERP functions (and if desired, others as well) and workflow can be extended in a seamless, scalable, sustainable manner to address vertical, international compliance, or customer-specific needs, while maintaining GL integrity and a business document approach to GL transactions. Such a capability is an aspect of delivering a multi-tenant, cloud-based ERP functionality that allows businesses to tailor the implementation to meet their individual needs while retaining the seamless features of the platform, such as upgrade capability, high performance, access control, reporting, and availability characteristics.

Other objects and advantages of the present disclosure will be apparent to one of ordinary skill in the art upon review of the detailed description of the present disclosure and the included figures.

BRIEF DESCRIPTION OF THE DRAWINGS

Embodiments of the subject matter disclosed herein in accordance with the present disclosure will be described with reference to the drawings, in which:

FIG. 4(c) shows a graphical user interface for prompting and acquiring input from a user during custom transaction according to an embodiment.

Note that the same numbers are used throughout the disclosure and figures to reference like components and features.

DETAILED DESCRIPTION

Figure 1:
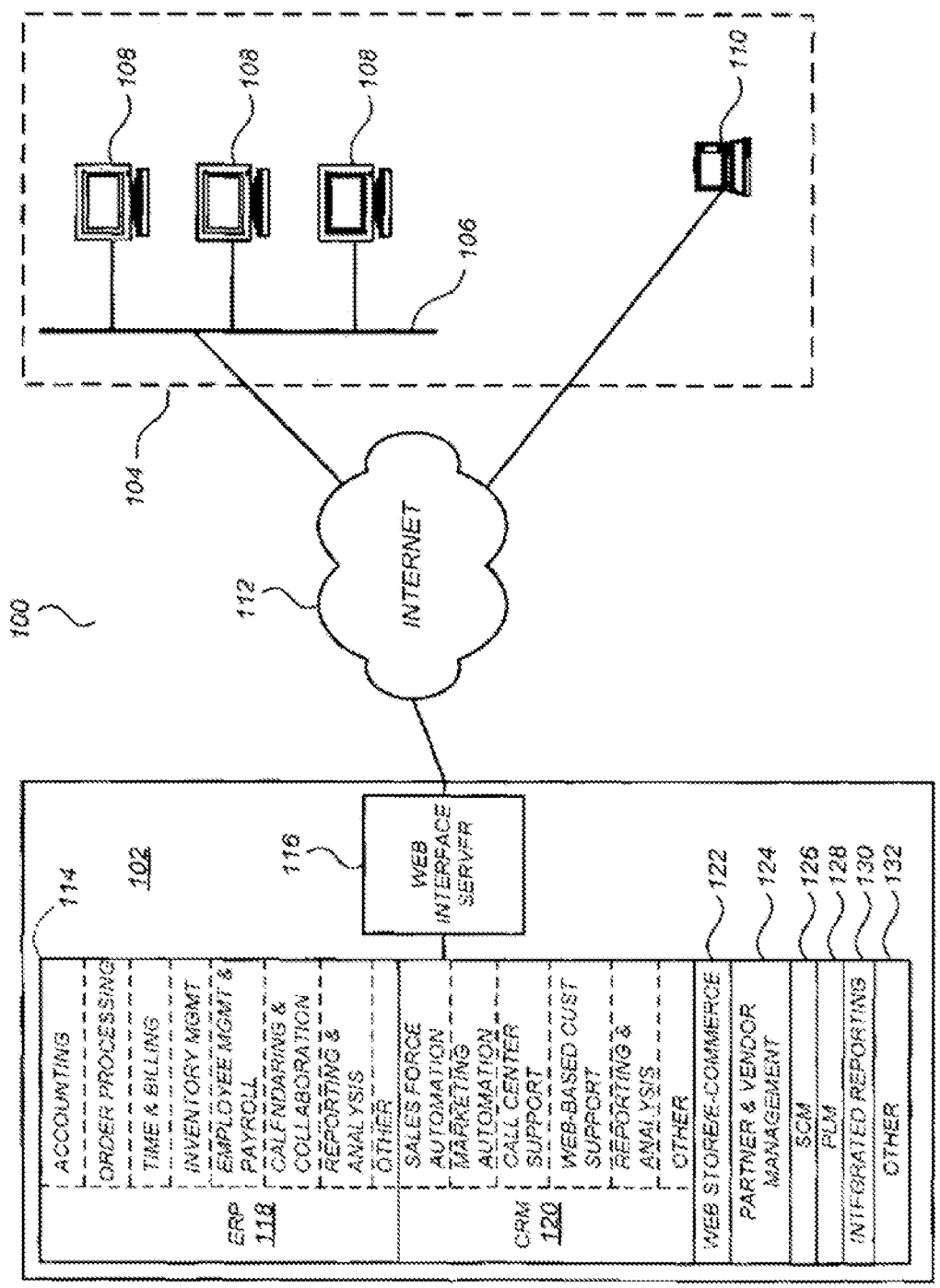
FIG. 1 is a diagram illustrating a system, including an integrated business system and an enterprise network in which an embodiment may be implemented.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

Among other things, the present subject matter may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, or the like) that is part of a client device, server, network element, or other form of computing device/platform and that is programmed with a set of executable instructions (e.g., software instructions), where the instructions may be stored in a suitable data storage element.

In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

In some embodiments, the systems, apparatuses, and methods may be implemented in the context of a multi-tenant, "cloud" based environment (such as a multi-tenant business data processing platform), typically used to develop and provide web services and business applications for end users. This exemplary implementation environment will be described with reference to FIGS. 1-3 (note that FIG. 2(a) of the Appendix also illustrates an example architecture or environment in which an embodiment of the disclosure may be implemented). Note that embodiments of the disclosure may also be implemented in the context of other computing or operational environments or systems, such as for an individual business data processing system, a private network used with a plurality of client terminals, a remote or on-site data processing system, another form of client-server architecture, and the like Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated customer relationship management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the disclosure may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, and the like, with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to run one or more software services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, and the like. A web server is a most often a combination of hardware and the software that helps deliver content, commonly by hosting a website, to client web browsers that access the web server via the Internet.

Figure 2:
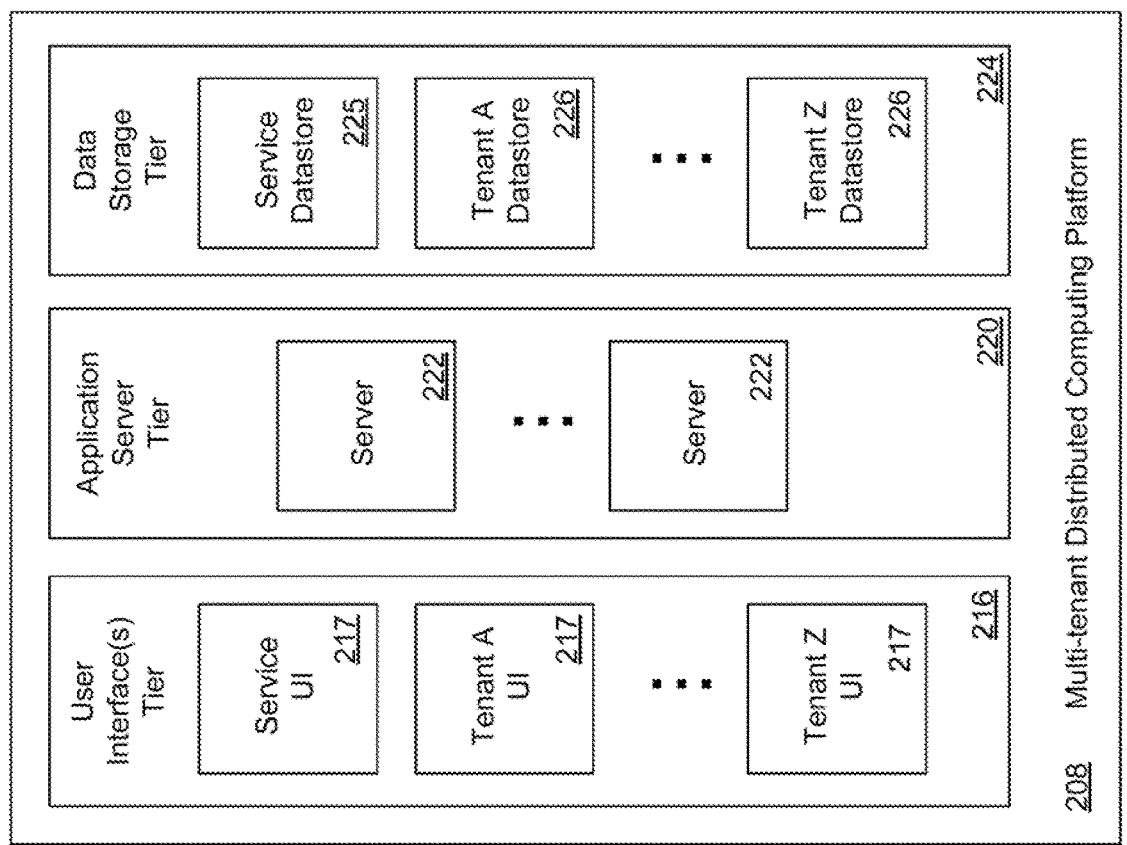
FIG. 2 is a diagram illustrating elements or components of an example operating environment in which an embodiment may be implemented.
Figure 2:
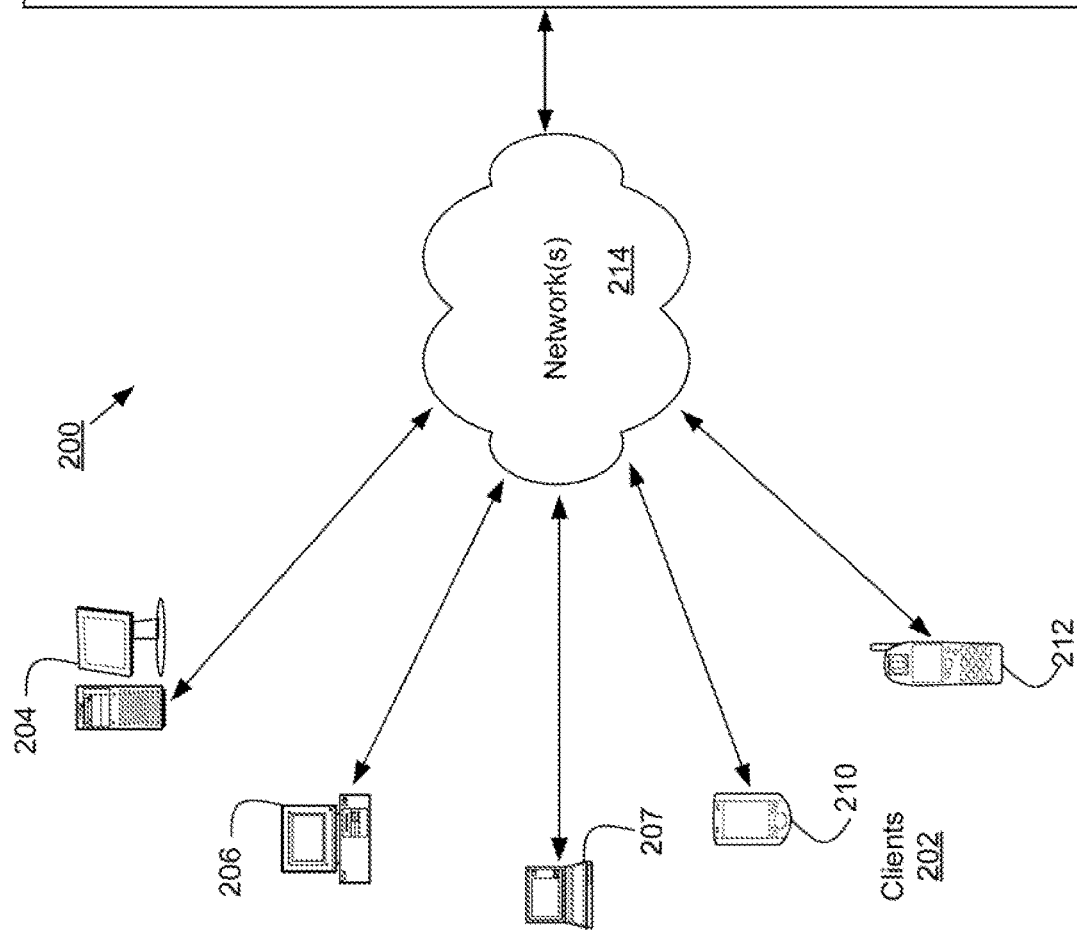

FIG. 2 is a diagram illustrating elements or components of an example operating environment 200 in which an embodiment of the disclosure may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, and the like Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, and the like. Data stores may be implemented with any suitable data storage technology, including structured query language (SQL) based relational database management systems (RDBMS).

In accordance with one embodiment of the disclosure, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an enterprise resource planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's application server tier 220.

Another business information system that may be provided as part of an integrated data processing and service platform is an integrated CRM system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, human resources management system (which may include medical/dental insurance administration, payroll, and the like), or supply chain management (SCM) system. Such functions or business applications are typically implemented by one or more modules of software code/instructions that are maintained on and executed by one or more servers 222 that are part of the platform's Application Server Tier 220.

As noted with regards to FIG. 1, the integrated business system shown in FIG. 2 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients."

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity. One challenge in such multi-tenant platforms is the ability for each tenant to tailor their instantiation of the integrated business system to their specific business needs; in one embodiment, the disclosure addresses this issue by abstracting the modifications away from the codebase and instead supporting such increased functionality as part of the application itself.

Figure 3:
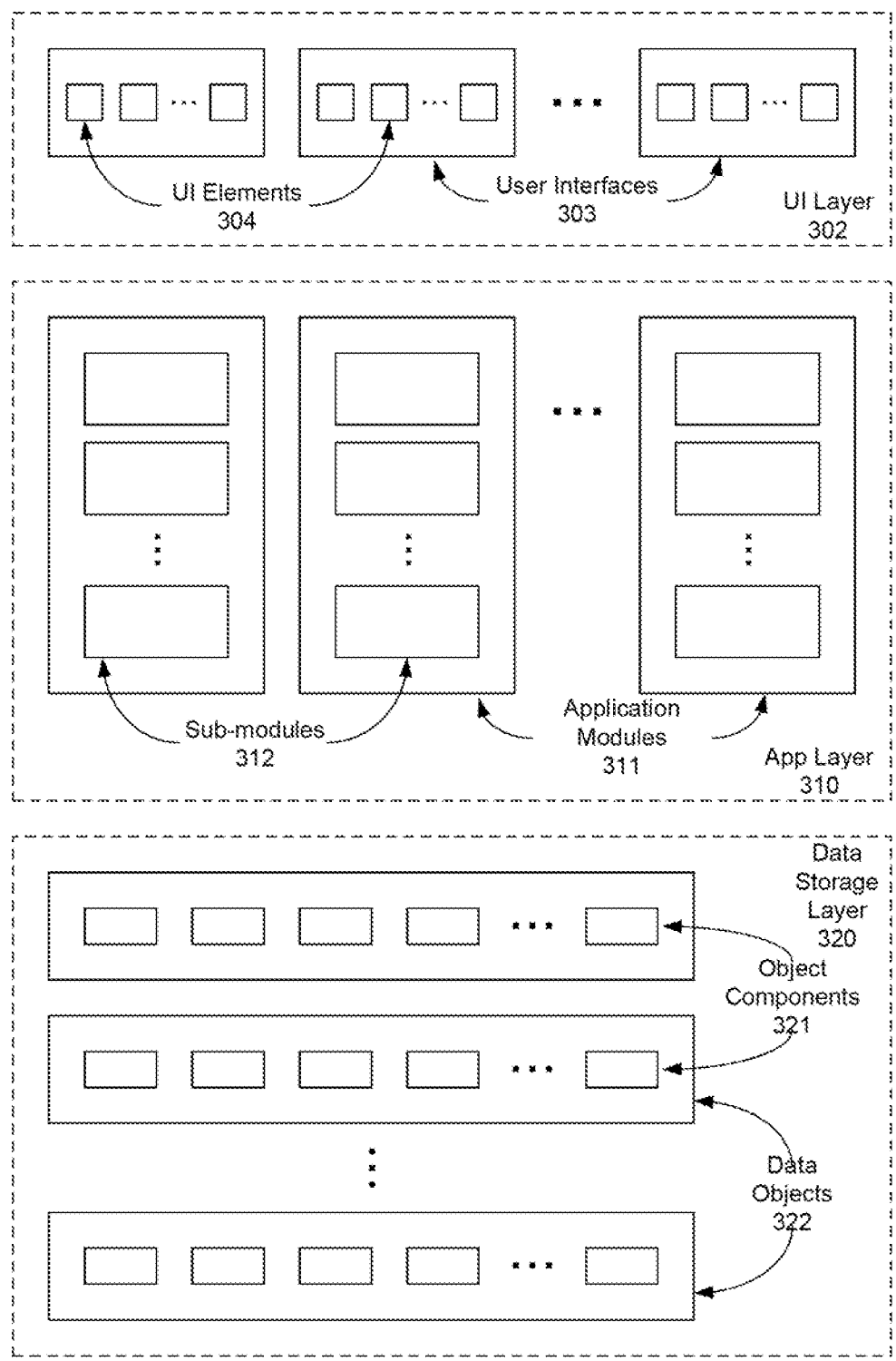
FIG. 3 is a diagram illustrating additional details of the elements or components of the multi-tenant distributed computing service platform of FIG. 2, in which an embodiment may be implemented.

FIG. 3 is a diagram illustrating additional details of the elements or components of the multi-tenant distributed computing service platform of FIG. 2, in which an embodiment of the disclosure may be implemented. The software architecture depicted in FIG. 2 represents an example of a complex software system to which an embodiment of the disclosure may be applied. In general, an embodiment of the disclosure may be used in conjunction with any set of software instructions that are designed to be executed by a suitably programmed processing element (such as a CPU, microprocessor, processor, controller, computing device, and the like). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the disclosure may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols. As described herein, embodiments of the disclosure provide a method for configuring aspects of a user interface (such as the data entry fields of a form) by specifying one or more user interface elements to present to a specified user.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may include those used to implement one or more aspects of the inventive systems and methods, such as one or more functions to enable a user to identify a need for a custom GL line, define a custom GL line, to set parameters for the custom GL line, and to execute the custom GL line when relevant, and the like The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the disclosure may be implemented include any suitable system that permits users to provide data to, and access, process, and utilize data stored in a data storage element (e.g., a database) that can be accessed remotely over a network. Further example environments in which an embodiment of the disclosure may be implemented include devices (including mobile devices), software applications, systems, apparatuses, networks, or other configurable components that may be used by multiple users for data entry, data processing, application execution, data review, and the like and which have user interfaces or user interface components that can be configured to present an interface to a user. Although further examples below may reference the example computing environment depicted in FIGS. 1-3, it will be apparent to one of skill in the art that the examples may be adapted for alternate computing devices, systems, apparatuses, processes, and environments.

Figure 4A:
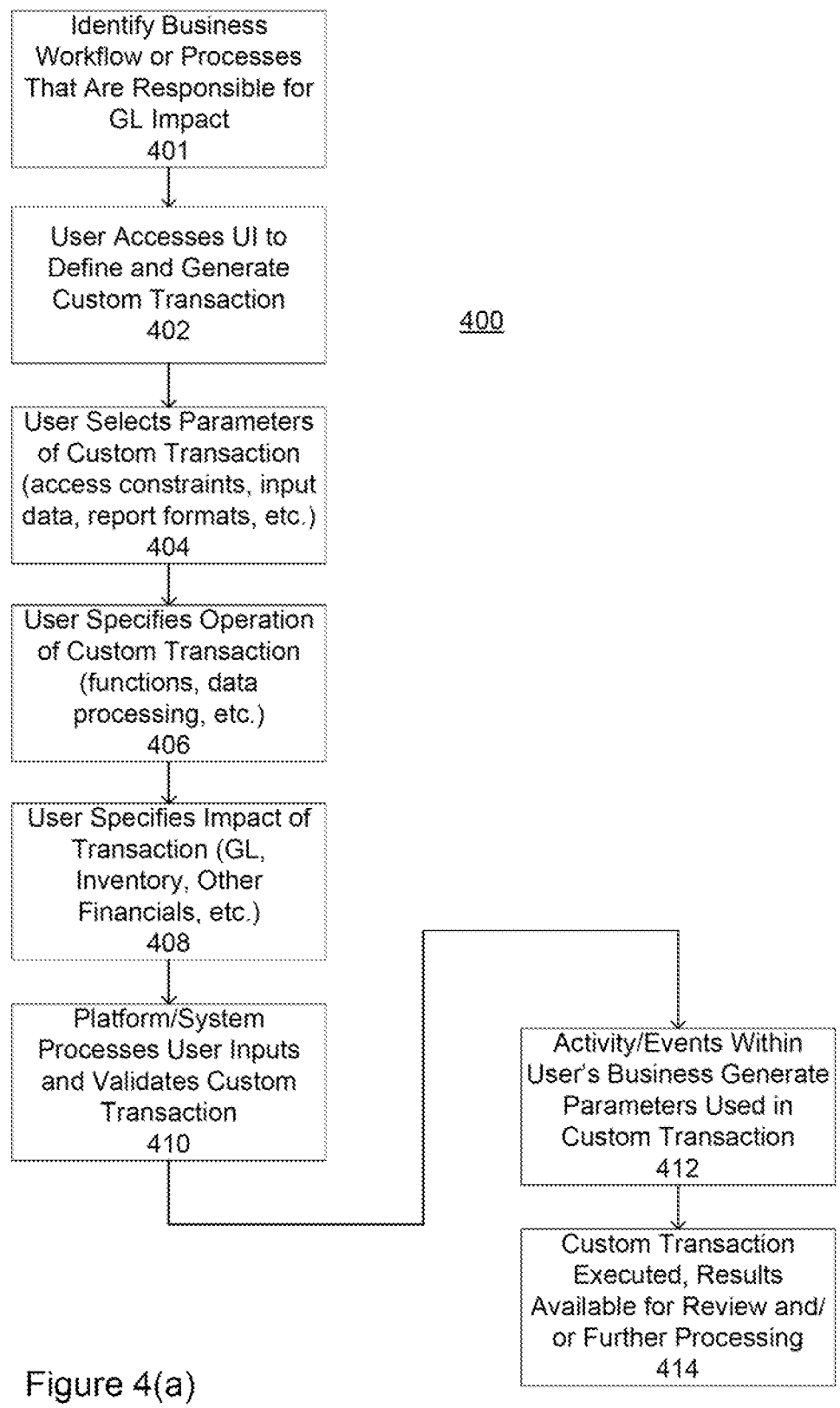
FIG. 4(a) is a flow chart or flow diagram illustrating a process, method, operation, or function for permitting a user to define and execute a custom transaction that may be used when implementing an embodiment of the disclosure.
Figure 4B:
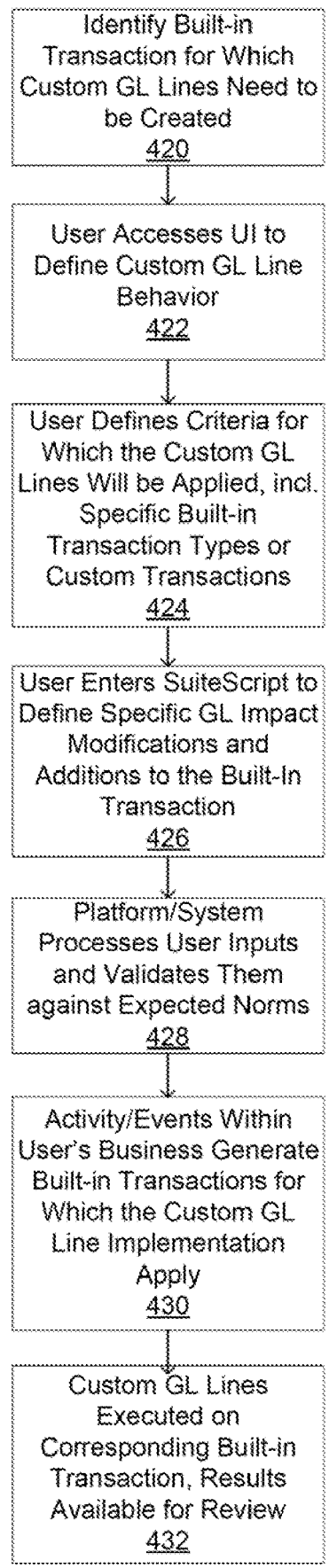
FIG. 4(b) is a flow chart or flow diagram illustrating a process, method, operation, or function for permitting a user to define and execute the application of Custom GL Lines that may be used when implementing an embodiment.

FIG. 4($a$) is a flow chart or flow diagram illustrating a process, method, operation, or function for permitting a user to define and execute a custom transaction that may be used when implementing an embodiment of the disclosure. As will become apparent, a custom transaction may include a transaction data manipulation procedure that may or may not affect general ledger functionality. For the purposes of FIG. 4($a$), a generalized custom transaction generation is shown from the perspective of defining a new overall transaction that may include one or more parameters affecting a GL as steps 401-410 and an end user utilizes one or more instances of the newly created custom transaction in steps 412-414. Following the discussion of FIG. 4(a) is a description of a method for altering an existing transaction data manipulation procedure that already includes one or more parameters affecting a GL and is presented with respect to FIG. 4(b).

Turning attention to FIG. 4(a) first, in one embodiment, a user (for example, a user with administrative privileges) wishing to define a new custom transaction accesses a user interface (UI) or process that assists in identifying those business processes or workflows that may impact the GL at step 401. This assists a user to be made aware of what internal processes or operations are occurring that may impact the GL and hence should be considered as a potential "custom transaction". The user is then provided with a user interface (a graphical user interface (GUI), for example) or process that is configured to enable the user to define and generate a desired custom transaction at step 402. As part of defining the custom transaction, the user may select variables, characteristics, terms, and the like (collectively referred to as parameters) that apply to the custom transaction at step 404. These parameters may include such elements as the categories, fields, data types, data names, or other data input characteristics for the data that will be used in implementing the definition of the custom transaction. It may also include user definition of the access control for the custom transaction (which may be expressed in terms of the role of the persons who are able to access the results of custom transaction), data reporting formats, and the like.

Next the user may define or otherwise specify the operation of the custom transaction at step 406. This may include defining the way in which the custom transaction will operate on the data inputs, the data processing operations that will be applied, the flow of the calculations, and the like. Then, the user specifies the impact of the custom transaction at step 408. This may be done as part of step 406 or as a separate step. The impact may be defined in terms of where the results of one or more calculations implemented in step 406 are recorded, input to another function, and the like. For example, a specific calculation performed in step 406 may then be used as an input to a function or operation in another module (such as CRM, eCommerce, or the like).

After defining the operation and impact of the custom transaction, the user submits that information to the system/platform. The multi-tenant business data processing platform processes the parameters for the defined custom transaction and validates the newly created custom transaction at step 410. This may involve performing one or more checks or evaluations to ensure that the custom transaction is properly defined and can be safely executed.

At some later time, one or more activities or events occur within the user's business that generate the set of inputs used in the custom transaction at step 412. That is, once the custom transaction has been defined in the system, an end user may instantiate a custom transaction. This may involve a sale, receipt of a shipment into inventory, recognition of revenue, and the like. In response, the custom transaction is executed at step 414, and the results are available for review and/or further processing.

In the context of a business suite of applications, business processes taking place in other departments may be integrated with the financials using custom transactions. For example, entering into an agreement with a vendor might have an associated financial impact related to future liabilities during the life of the agreement. Through the definition of a 'future liability' custom transaction type and the creation of an associated workflow tied to the submission of an agreement approval record, it is possible to cause a GL impact to be posted in accordance with GAAP. The subsequent execution of the agreement could similarly have a further GL Impact that can be captured, reviewed and posted in a custom transaction, and as such be fully trackable and auditable after the fact. Thus, custom transaction that affect that may impact the GL may be created by a user and stored with other existing transaction data manipulation procedures that impact the GL. As alluded to above, existing transaction data manipulation procedures that have a GL impact may be altered in a similar custom manner.

FIG. 4(b) is a flow chart or flow diagram illustrating a process, method, operation, or function for permitting a user to alter an existing transaction data manipulation procedure that may be used when implementing an embodiment of the disclosure. FIG. 4(a) as discussed above defines a manner in which a user may create an entirely new custom transaction. Such a custom transaction may be further altered (e.g., further customized) as discussed next in FIG. 4(b) for specific GL behavior. By the same token, a previously unaltered "built-in" transaction may also be altered to exhibit a customized GL behavior. As such, the steps discussed in FIG. 4(b) may apply to any transaction.

As shown in this figure, in one embodiment, a user wishing to alter how a specific transaction data manipulation procedure that impacts the GL (sometimes called a custom GL lines transaction) operates, at step 420, accesses a user interface or process that assists in identifying the criteria with which to identify transactions that are applicable for that use case. This assists a user to be made aware of what internal processes or operations are occurring that may impact the GL. Upon selection of an existing transaction data manipulation procedure having GL impact, the user may access each existing parameter to alter the behavior of each existing parameter at step 422. Upon access at step 424, the user may utilize the UI to defines specific criteria for which the GL impacting transaction will be applied, This may further include making a decision to later an existing (e.g., built-in) specific transaction types or to define a new custom transaction altogether.

The user may be further provided, at step 426, with a user interface within which they can submit script language that determines the specific altered GL line calculations and GL accounts to be impacted. In particular, a user may define a plug-in which includes a script file (e.g., a proprietary script file) that defines specific GL impact modifications to be applied (including calculations of values therein) and selections of which transactions are to be modified by the script file—identified by transaction type, subsidiary, and the like. In one embodiment, the criteria may be defined as being any field or attribute associated with the corresponding transaction type: e.g., class, department, location, customer, item, date range, and the like. Upon creation of a transaction which matches the criteria for the plug-in, the script file is executed, creating corresponding additional GL impact lines seamlessly (without any user interaction). T In another embodiment, a user interface can be provided to allow the user to define the GL accounts and calculations via a point-and-click mechanism instead of via the script language. As part of defining the custom GL lines implementation, the user may select variables, parameters, characteristics, terms, and the like that apply to the implementation. These may include such parameters as the categories, fields, data types, data names, or other data input characteristics for the data that will be used in implementing the definition of the altered transaction data manipulation procedure (e.g., the custom GL lines).

After defining the operation and impact of the altered GL impacting transaction, the user submits that information to the system/platform. The multi-tenant business data processing platform processes the parameters for the altered GL impacting transaction and validates the newly altered transaction at step 428. This may involve performing one or more checks or evaluations to ensure that the altered GL impacting transaction is properly defined and can be safely executed.

At some later time, one or more activities or events occur within the user's business that generate the set of inputs used in the altered GL impacting transaction at step 430. This may involve a sale, receipt of a shipment into inventory, recognition of revenue, and the like. In response, the altered GL impacting transaction is executed at step 432, and the results are available for review and/or further processing.

In another embodiment, custom GL lines can be used in conjunction with custom transactions to modify the custom transaction behavior in specific circumstances, e.g., when utilized in a different country or when posting to a different accounting book in order to address alternate financial reporting requirements. A skilled artisan understand that the steps described with respect to FIGS. 4(*a*) and 4(*b*) may be representative of computer-executable instructions for facilitating the input of data from the user at a client computer associated with the user via a user interface, such as a graphical user interface as described next with respect to FIG. 4(*c*).

FIG. 4(*c*) shows a graphical user interface for prompting and acquiring input from a user during custom transaction according to an embodiment. In this GUI 450, each step described above with respect to FIGS. 4(*a*) and 4(*b*) may be associated with one or more query boxes in a display configured to receive typed or spoken input from the user. In other embodiments, each query box may be associated with a drop-down menu of choices for a user to select. Alternatively, each query box may further represent a script editor allowing an experienced user to enter code directly to the custom transaction. Thus, the combination of inputs at each query box results in a grouping of transaction parameters that may be used to define a specific custom transaction as created in a simply point-and-click manner by a user. Further, the custom transactions or altered transactions may be associated with a transaction name entered by the user and then stored in a data store associated with the user or the user's enterprise. Such a data store may be at a local client to be accessed when the ERP system is instantiated or may be a data store associated with a server computer that is associated the ERP system itself (as generally described in the computing environment of FIGS. 1-3) such that the data store also stores all other defined transactions in addition to the custom transaction.

In the GUI 450, a number of query boxes are presented to a user when altering definitions for GL impacting transaction. A first one may be a transaction name query box 461. In query boxes that follow, several additional transaction parameters may be defined or chosen by the user including:

Transaction Numbering Scheme 462 that may enable a specific manner of transaction numbering on a per transaction type basis that remains consistent with the implementation of core transactions type (both with respect to transaction number and with gapless GL numbering).

Common Fields Selection 463 that allows a user to choose commonly used form fields such as date, created by, description/purpose and the like.

Custom Fields Selection 464 that allows a user to define new custom fields such as country or region for tax impact, manager notification, or any other manner of a form field that is not one of the common fields available and provided in the Common Fields Selection 463.

Printable Forms Selection 465 that allows a user to choose specific forms that are to be printed each time the altered transaction is implemented.

Roles and Permissions Selection 466 that allows a user to define specific permissions of what personnel may be allowed to invoke or modify the altered transaction. This may further define what personal receive notifications when such a altered transaction is invoked or modified. Further yet, specific roles may be defined such as managerial approval required by specific personnel.

Workflow Selection 467 allows a user to define custom approval of workflow based on impacted departments and currency value thresholds. This may impact a standard business workflow and identify peer transactions from which the custom transaction may be based. Further, workflow relationships to other transaction types, including ability to initiate workflows or be incorporated into existing standard workflows is provided here. This may include field mapping between one or more peer transactions and the custom transaction, and from the custom transaction to the fields in the next transaction type or process in the workflow.

Navigation and Help Selection 468 allows a user to determine how and where navigation and help aspects interact with the new or altered transaction. For example, each altered transaction may be associated with a new own entry in the navigation menus for the application and associated with new help documentation published seamlessly within the primary help system.

Reporting and Search Selection 469 allows a user to incorporate reporting procedures, search parameters, key performance indicators, and the like, through simple configuration and selection through invocation of standard user interfaces for these application areas.

Posting Behavior 470 provides a query box for the user to define specific posting behavior with respect to accounts such as the general ledger or other ledgers. The user may define debits and credits and indicate of such debits and credits must total to zero upon entry. Here a user may further define posting behaviors that may initialize or impact subsequent transactions in the workflow, e.g., whether the altered transaction postings is reversed and replaced by the subsequent transaction, whether the altered transaction posting modifies the postings in the subsequent transaction as opposed to a related standard transaction type, and whether subsequent transaction's workflow is modified as a result of the altered transaction occurring earlier in the workflow.

Inventory Impact 471 allows a user to define how the altered transaction interacts with inventory. For example, whether or not the altered transaction even has the ability to impact Inventory through exposure of an Item Machine API. Such an option allows a user to define, for example, a 'simple invoice' with reduced overhead as compared to a core product invoice record.

Accounts Receivable and Account Payable Handling 472 allows a user to define the altered transaction as an AP/AR and cash-basis/accrual basis transaction and be included in the core workflows and reporting capabilities consistent with those business functions as supported by the ERP system.

Transformations 473 allows a user to transform an existing core transaction record to an altered transaction record as well as an existing altered transaction record to a core transaction record. Further, a user may transform an altered transaction record having a custom transaction type to another transaction type (e.g., consider the model of Opportunity→Quote→Sales Order).

Together, these altered GL impacting transaction parameters when used to define an altered transaction by the user provide native support in the ERP system for changing existing GL-impacting transactions. That is, a base ERP system is able to function without interference or understanding of the custom workflows represented by the altered GL-impacting transactions. This is advantageous in multi-tenant SaaS (cloud) systems whose margins depend on the economies of scale possible by having a single codebase and being able to upgrade the system at will, without concern that customizations will be impacted. These and other features are advantageous over conventional systems that do not provide point-and-click based configuration or enhancement/update of existing GL-impacting transaction types (and their associated workflow and GL impacts) by end users. Rather, such conventional ERP systems are built and deployed by developer resources, lack flexibility and require re-implementation as part of a system upgrade. That is, conventional ERP systems contribute to version lock as any customizations impact the ability to upgrade. Such conventional systems also pose a particular challenge in the case of solutions implemented to meet local statutory requirements that could change over time and with minimal notice. Custom transactions and altered transactions implemented with the flexibility described herein enables an internal development team to accelerate vertical and localization efforts by providing a 'pluggable' capability that is fundamentally part of a core product but which provides an opportunity to define very specific business processes and workflows without the overhead that comes along with some of the pre-defined business workflows that exist as standard, e.g., Opportunity→Quote→Sales Order→Invoice. Existing functional modules such as recurring billing and fixed assets may benefit by providing more powerful reporting, audit trail and permissions controls by default without explicit coding efforts and while still maintaining upgradability.

Additionally, conventional ERP systems with altered transaction support may leverage only the generic GL Journal transaction record at the completion of a specific business workflow, thereby limiting the ability for subsequent searching/reporting filtering on the specific transaction types and control of access by transaction type-based roles and permissions allocations. Having native custom transaction support as described above, the ERP vendor itself is unaware of the different uses of the generic GL Journal transaction in their application and is therefore unable to properly predict and test customization scenarios proactively for their customers. Further, the custom transactions approach brings material benefits to the developer and user in that standard 'infrastructure' (testing, scalability, performance monitoring, and the like) of the ERP system is applied by default while providing the flexibility the end user needs in meeting the unique aspects of the end user's business.

Further yet, in the context of an integrated business suite, GL-impacting events can be inferred from business activities that would typically occur outside of the purview of the ERP/financial accounting system. For example, having altered GL-impacting transactions supported in a native manner, purchase requests managed in a procurement system may be marked for accrual purposes and have a altered transaction type called 'procurement accrual' created to capture the future obligations (which can then be routed for approval to the appropriate authorizers based on the type and subsequently be submitted for inclusion as part of a financial period end process). Similarly, payroll activities tracked in a separate system might be integrated into the accounting system of record with a specific 'payroll transaction' custom transaction type, with permissions controlled by reference to the transaction type to ensure that only certain users can see the details therein.

In yet another advantage, altered transactions shield both the vendor of the financial software and end users from the inherent risks associated with tampering with core application code. This enables the implementer to take advantage of other core system capabilities by default and with ease, speeds up the implementation effort, and reduces the overhead and ongoing burden of the approach that is required in traditional systems. In the context of a multi-tenant, cloud-based system it is not practical to expose the core application code for low level modification by end users; doing so would, in essence, make that particular instance of the application a single-tenant environment. As such, a practical way to support such customization of the ERP and accounting system in a multi-tenant environment is to make custom and altered transactions natively available that allows such customer-specific modifications while protecting the rest of the customer base and the application vendor themselves from the broad ramifications of such changes.

As discussed throughout this disclosure, conventional ERP systems provide hard-coded GL impact behaviors within a standard set of transactions types. Custom modifications to such transaction type behaviors, if possible at all, require changing of core application code which may lead to maintenance and upgrade complexities, version locking, vendor lock-in, and the like. Additionally, sometimes GL impact modifications are made after-the-fact with separate GL Journal adjustments cause additional postings to the GL, resulting in more possible clerical errors and making audit trails more complex. Having the above-described system and method for altering an existing transaction type having a GL impact within the framework of the overall system eliminates or greatly reduces the influence of these problems. Therefore, having alterable GL lines enables a GL software vendor to rapidly iterate and modify a product to meet the needs of specific vertical or international business requirements. Custom GL lines further provide an ability for customers/partners/implementers to tailor the GL impact of any standard transaction including. invoice, credit Memo, vendor bill, vendor credit, inventory adjustment, and the like,) via a cloud computing platform.

For example, an invoice being created for a transaction in Brazil can be modified such that the gross value (including taxes) is posted to a revenue account in the GL. In conjunction with a multi-Book feature, the GL posting for Brazil can occur in a distinct Brazil book while a standard behavior (posting revenue net of taxes) may occur in a primary US book. Further, multi-book allows for the posting behavior in a secondary book (Brazil) to be entirely different to that in the primary book (US).

Figure 5:
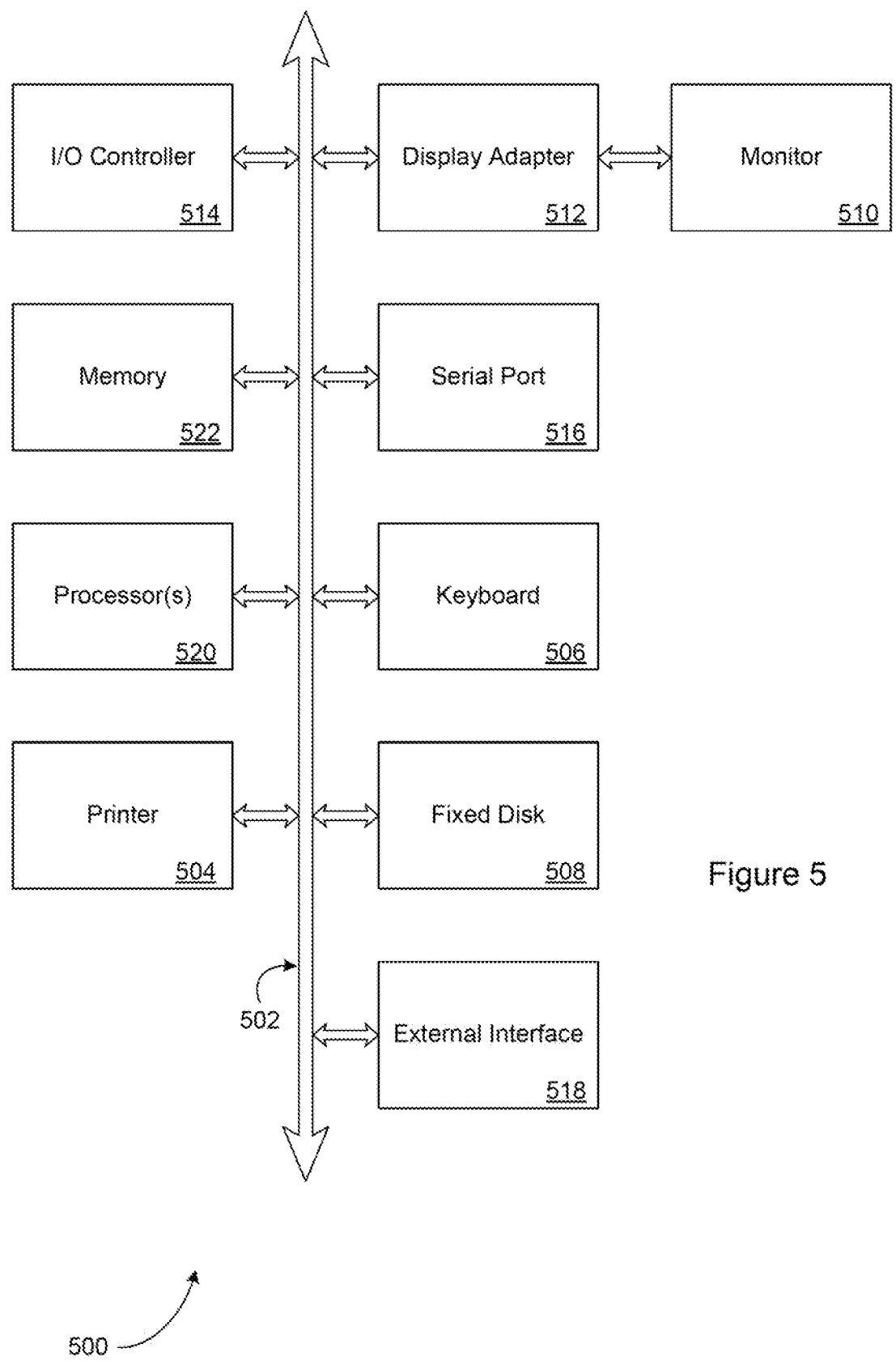
FIG. 5 is a diagram illustrating elements or components that may be present in a computer device or system configured to implement a method, process, function, or operation in accordance with an embodiment.

In accordance with one embodiment of the disclosure, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 500 configured to implement a method, process, function, or operation in accordance with an embodiment of the disclosure. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/ output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the disclosure and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications can be made without departing from the scope of the claims below.

That which is claimed is:

1. A computer-implemented method, comprising:
in an enterprise resource planning computing environment generated as a result of a computer processor executing core code, storing a procedure set comprising a plurality of transaction data manipulation procedures that are performed as a result of execution of the core code in a data store, each of the plurality of transaction data manipulation procedures defining core functions of the enterprise resource planning computing environment for generating a data structure corresponding to a general ledger;
granting a plurality of client terminals access to the core code over a communication network, allowing the client terminals to cause execution of the core code and display information included in the data structure for the general ledger;
serving content for a graphical user interface to a first client terminal included in the plurality of client terminals, wherein the served content for the graphical user interface is native to the core code, and the graphical user interface comprises one or more parameter fields configured to be populated with: (I) a custom procedure parameter, (II) an operation to be performed on the custom procedure parameter, and (III) an impact that the operation performed on the custom procedure parameter is to have on the general ledger;
receiving, over the communication network, the custom procedure parameter, the operation and the impact as inputs into the graphical user interface, wherein the custom procedure parameter defines a change to the data structure for the general ledger generated according to the plurality of transaction data manipulation procedures;
based on the received inputs, generating an altered transaction data manipulation procedure set comprising a custom procedure corresponding to the operation performed on the custom procedure parameter, wherein the altered transaction data manipulation procedure set implements the change to the data structure;
validating the custom procedure by performing an evaluation of the custom procedure to determine that the impact of the operation of the custom procedure does not interfere with execution of the core code;
storing the validated custom procedure in the data store in a manner that renders the core code updatable without affecting the altered transaction data manipulation procedure set, wherein the plurality of transaction data manipulation procedures in the procedure set remain unaltered in the data store after generation of the altered transaction data manipulation procedure set; and controlling access to the altered transaction data manipulation procedure set stored in the data store by granting at least a second client terminal, of the plurality of client terminals, permission to use the altered transaction data manipulation procedure set.

2. The computer-implemented method of claim 1, wherein the custom procedure parameter comprises one of the group including: assigning a transaction number, assigning a date, assigning a creator, manipulating data in a general ledger, initiating notification to government agency, initiating notification to a manager, requesting approval from a manager, initiating printing of a form, affecting workflow of a different transaction, populating a help menu; populating a navigation menu, manipulating data related to an inventory, initiating a reporting, indicating a posting requirement, manipulating data related to an account payable, manipulating data related to an account receivable, initiating a transformation of the altered transaction data manipulation procedure, and initiating a transformation of a related transaction data manipulation procedure.

3. The computer-implemented method of claim 1, wherein the data store is associated with a server computer that hosts the enterprise resource planning system and serves the content for the graphical user interface.

4. The computer-implemented method of claim 1, further comprising:
   invoking the altered transaction data manipulation procedure set; and
   updating data in the general ledger in response to invoking the altered transaction data manipulation procedure set.

5. A non-transitory computer-readable medium having computer-executable instructions that when executed in a computing environment cause a computer to:
   in an enterprise resource planning computing environment generated as a result of a computer processor executing core code, store a plurality of transaction data manipulation procedures that are performed as a result of execution of the core code in a data store, each of the plurality of transaction data manipulation procedures defining core functions of the enterprise resource planning computing environment for generating a data structure corresponding to a general ledger;
   grant a plurality of client terminals access to the core code over a communication network, allowing the client terminals to cause execution of the core code and display information included in the data structure for the general ledger;
   serve content for a graphical user interface to a first client terminal included in the plurality of client terminals, wherein the served content for the graphical user interface is native to the core code, and the graphical user interface comprises one or more parameter fields configured to be populated with: (I) a custom procedure parameter, (II) an operation to be performed on the custom procedure parameter, and (III) an impact that the operation performed on the custom procedure parameter is to have on the general ledger;
   receive, over the communication network, the custom procedure parameter, the operation and the impact as inputs into the graphical user interface, wherein the custom procedure parameter defines a change to the data structure for the general ledger generated according to the plurality of transaction data manipulation procedures;
   based on the received custom procedure parameter, generate an altered transaction data manipulation procedure comprising a custom procedure corresponding to the operation performed on the custom procedure parameter, wherein the altered transaction data manipulation procedure implements the change to the data structure;
   validate the custom procedure by performing an evaluation of the custom procedure to determine that the impact of the operation of the custom procedure does not interfere with execution of the core code;
   store the validated custom procedure in the data store in a manner that renders the core code updatable without affecting the altered transaction data manipulation procedure, wherein the plurality of transaction data manipulation procedures in the procedure set remain unaltered in the data store after generation of the altered transaction data manipulation procedure; and
   control access to the altered transaction data manipulation procedure stored in the data store to grant at least a second client terminal, of the plurality of client terminals, permission to use the altered transaction data manipulation procedure.

6. The computer-readable medium of claim 5, further comprising computer-executable instructions that, when executed, cause the computer to execute the altered transaction data manipulation procedure through instantiation by the second client terminal, the second client terminal being different than the user that submitted the inputs.

7. The computer-readable medium of claim 5, further comprising computer-executable instructions that, when executed, cause the computer to update at least another one of the transaction data manipulation procedures maintained in the data store while not affecting the altered transaction data manipulation procedure stored in the data store.

8. A computer-based system, comprising:
   a server computer configured to:
   (i) execute core code of an enterprise resource planning system, wherein the enterprise resource planning system grants a plurality of users associated with a plurality of business entities access to one or more of a plurality of transaction data manipulation procedures that are performed as a result of execution of the core code, each of the plurality of transaction data manipulation procedures: (a) defines core functions of the enterprise resource planning computing environment for generating a data structure corresponding to, and (b) is maintained at the server computer,
   (ii) grant a plurality of client terminals access to the core code over a communication network, allowing the client terminals to cause execution of the core code and display information included in the data structure for the general ledger, and
   (iii) serve content for a graphical user interface to a first client terminal included in the plurality of client terminals, wherein the served content for the graphical user interface is native to the core code, and the graphical user interface comprises one or more parameter fields configured to be populated with: (I) a custom procedure parameter, (II) an operation to be performed on the custom procedure parameter, and (III) an impact that the operation performed on the custom procedure parameter is to have on the general ledger; and
   a communications module coupled to the server computer and configured to receive, over the communication network, the custom procedure parameter, the operation and the impact input into the graphical user interface, wherein the custom procedure parameter defines a change to the data structure for the general ledger generated according to the plurality of transaction data manipulation procedures;

wherein the server computer is further configured to:
(i) based on the received input, generate an altered transaction data manipulation procedure comprising a custom procedure corresponding to the operation performed on the custom procedure parameter, wherein the altered transaction data manipulation procedure implements the change to the data structure;
(ii) validate the custom procedure by performing an evaluation of the custom procedure to determine that the impact of the operation of the custom procedure does not interfere with execution of the core code;
(iii) store the validated custom procedure in the data store in a manner that renders the core code updatable without affecting the altered transaction data manipulation procedure, wherein the plurality of transaction data manipulation procedures are maintained unaltered at the server computer.

9. The computer-based system of claim 8, further comprising an update module coupled to the server computer, wherein the update module is configured to execute the custom procedure corresponding to the custom procedure parameter to update the general ledger to reflect an influence of the altered transaction data manipulation procedure on the general ledger.

10. The computer-based system of claim 8, further comprising an update module coupled to the server computer and configured to update at least one other transaction data manipulation procedure while maintaining the altered transaction data manipulation procedure in an unaltered state.

11. The computer-based system of claim 8, further comprising a cloud computing environment within which the server computer and the client computer are executing computer-executable instructions.

12. The computer-based system of claim 8, wherein each of the transaction data manipulation procedures comprises a plurality of transaction parameters from the group including: assigning a transaction number, assigning a date, assigning a creator, manipulating data in a general ledger, initiating notification to government agency, initiating notification to a manager, requesting approval from a manager, initiating printing of a form, affecting workflow of a different transaction, populating a help menu; populating a navigation menu, manipulating data related to an inventory, initiating a reporting, indicating a posting requirement, manipulating data related to an account payable, manipulating data related to an account receivable, initiating a transformation of the altered transaction data manipulation procedure, and initiating a transformation of a related transaction data manipulation procedure.

13. The computer-based system of claim 8, further comprising a transformation module configured to transform a transaction invoked from one of the plurality of transaction data manipulation procedures into a transaction associated with the altered transaction data manipulation procedure.

14. The computer-based system of claim 8, further comprising the first client terminal communicatively coupled to the server computer and configured to display the graphical user interface into which the custom procedure parameter, the operation and the impact are input by a user of the first client computer.

* * * * *